(12) United States Patent
Solanki et al.

(10) Patent No.: US 12,397,432 B2
(45) Date of Patent: Aug. 26, 2025

(54) RHEOLOGY TESTING SYSTEMS AND METHODS FOR OPERATING THE SAME

(71) Applicant: Dow Global Technologies LLC, Midland, MI (US)

(72) Inventors: Sanjay C. Solanki, Sewickley, PA (US); Christopher M. Thurber, Midland, MI (US); Jin Wang, Midland, MI (US); Donald L. McCarty, II, Midland, MI (US); Sylvie Vervoort, Terneuzen (NL); Peter Hermann Roland Sandkuehler, Horgen (CH); Cornelis F. J. Den Doelder, Terneuzen (NL); Paul A. OConnell, Lake Jackson, TX (US); John E. Lund, Midland, MI (US); Colleen M. Southwell, Midland, MI (US); Eric L. Marchbanks, Midland, MI (US); Marc M. J. Dees, Terneuzen (NL); Kurt A. Koppi, Midland, MI (US); Birgit Braun, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 614 days.

(21) Appl. No.: 17/762,412

(22) PCT Filed: Aug. 26, 2020

(86) PCT No.: PCT/US2020/047936
§ 371 (c)(1),
(2) Date: Mar. 22, 2022

(87) PCT Pub. No.: WO2021/061327
PCT Pub. Date: Apr. 1, 2021

(65) Prior Publication Data
US 2022/0381664 A1    Dec. 1, 2022

Related U.S. Application Data

(60) Provisional application No. 62/904,373, filed on Sep. 23, 2019.

(51) Int. Cl.
*B25J 9/16* (2006.01)
*B25J 11/00* (2006.01)
(Continued)

(52) U.S. Cl.
CPC ......... *B25J 9/1679* (2013.01); *B25J 11/0085* (2013.01); *B25J 15/0066* (2013.01);
(Continued)

(58) Field of Classification Search
CPC .... B25J 11/0085; B25J 15/0066; B25J 18/00; B25J 9/1679; G01N 1/04; G01N 1/286;
(Continued)

(56) References Cited

U.S. PATENT DOCUMENTS

| 4,584,882 A | 4/1986 | Tosaki |
| 8,061,240 B2 | 11/2011 | Hohensinner et al. |

(Continued)

FOREIGN PATENT DOCUMENTS

| CN | 206208588 U | 5/2017 |
| GB | 2288879 A | 11/1995 |

(Continued)

OTHER PUBLICATIONS

Advanced Materials Science & Engineering Center, Rheometer Concise Operating Procedures, Jan. 2019 (Year: 2019).*
(Continued)

*Primary Examiner* — David L Singer
(74) *Attorney, Agent, or Firm* — Dinsmore & Shohl, LLP

(57) ABSTRACT

A rheology system includes a rheometer including a lower plate and an upper plate, a manipulator including an arm, a
(Continued)

loading end effector, a cleaning end effector, and a controller communicatively coupled to the rheometer and the manipulator, the controller including a processor and a computer readable and executable instruction set, which when executed, causes the processor to direct the manipulator to couple the loading end effector to the arm, direct the manipulator engage a specimen with the loading end effector, direct the manipulator to position the specimen on the lower plate of the rheometer, direct the upper plate to engage the specimen between the upper plate and the lower plate, direct the manipulator to couple the cleaning end effector to the arm, and direct the manipulator to engage the lower plate with the cleaning end effector.

19 Claims, 7 Drawing Sheets

(51) Int. Cl.
   *B25J 15/00* (2006.01)
   *B25J 18/00* (2006.01)
   *G01N 1/04* (2006.01)
   *G01N 1/28* (2006.01)
   *G01N 1/34* (2006.01)
   *G01N 11/00* (2006.01)
   *G01N 11/16* (2006.01)
   *G01N 35/00* (2006.01)

(52) U.S. Cl.
   CPC .............. *B25J 18/00* (2013.01); *G01N 1/04* (2013.01); *G01N 1/286* (2013.01); *G01N 1/34* (2013.01); *G01N 11/165* (2013.01); *G01N 35/0099* (2013.01); *G01N 2011/0006* (2013.01); *G01N 2011/002* (2013.01); *G01N 2203/0206* (2013.01)

(58) Field of Classification Search
   CPC .......... G01N 1/34; G01N 11/00; G01N 11/14; G01N 11/165; G01N 2011/0006; G01N 2011/002; G01N 2011/0033; G01N 2203/0206; G01N 35/0099
   See application file for complete search history.

(56) References Cited

U.S. PATENT DOCUMENTS

| | | | |
|---|---|---|---|
| 2002/0078768 A1 | 6/2002 | Hiatt et al. | |
| 2009/0078035 A1* | 3/2009 | Mecca | G01N 3/567 73/150 R |
| 2009/0272178 A1* | 11/2009 | Hohensinner | G01N 11/14 73/54.37 |
| 2018/0133893 A1* | 5/2018 | Motojima | B25J 9/0087 |
| 2018/0265748 A1* | 9/2018 | Behling | C08F 220/1804 |

FOREIGN PATENT DOCUMENTS

| | | | | |
|---|---|---|---|---|
| JP | H04177145 A | | 6/1990 | |
| JP | H02251759 A | | 10/1990 | |
| JP | 10510867 A | | 1/1993 | |
| JP | H0510867 A | * | 1/1993 | ............. G01N 11/14 |
| JP | 2000352551 A | * | 12/2000 | ............... G01N 3/04 |
| JP | 2016209949 A | | 12/2016 | |
| WO | 2019027518 A1 | | 2/2019 | |

OTHER PUBLICATIONS

TA Instruments, Brochure Discovery Hybrid Rheometer, 2013 (Year: 2013).*
TA Instruments, Brochure Discovery Hybrid Rheometers Temperature Systems and Accessories, 2014 (Year: 2014).*
TA Instruments, Discovery Hybrid Rheometer (DHR Series) Getting Started Guide (Year: 2014).*
Thermo Scientific Haake Mars Rheometer Instruction Manual, Version 2.6 Oct. 2014 (Year: 2014).*
Houel, User Manual Instructions Physica MCR501 Anton Paar, 2006 (Year: 2006).*
Bruyn, ARES Rheometer Standard Operating Procedures, 2012 (Year: 2012).*
Asphalt In-House Calibration Procedure # 17 Dynamic Shear Rheometer (DSR), 2010 (Year: 2010).*
AR 2000 Rheometer Rheometrics Series Operator's Manual, PN 500106.002 Rev. L, Issued Jan. 2007 (Year: 2007).*
AR2000ex Rheometer Standard Operating Procedures (Year: 2018).*
TA Instruments, Accessories, Parts, & Consumables Price List—Effective Jan. 2016 (Year: 2016).*
Japanese Office Action dated Jul. 30, 2024, pertaining to JP Patent Application No. 2022-514280, 10 pgs.
International Search Report and Written Opinion dated Nov. 19, 2020, pertaining to Int'l Patent Application No. PCT/US2020/047936.

* cited by examiner

116- Heating Element
118- Upper Actuator
182- Cutting Member

RHEOLOGY TESTING SYSTEMS AND METHODS FOR OPERATING THE SAME

CROSS-REFERENCE TO RELATED APPLICATIONS

This application is a National Stage Entry under 35 U.S.C. § 371 of International Patent Application No. PCT/US2020/047936, filed Aug. 26, 2020, which claims priority to U.S. Provisional Patent Application No. 62/904,373, filed on Sep. 23, 2019, the entire disclosures of both of which are hereby incorporated by reference.

FIELD

The present disclosure generally relates to rheology testing systems, and more particularly, to systems and methods for cleaning rheology testing systems between testing cycles.

BACKGROUND

Characterizing physical properties of materials is useful in analyzing and improving chemical formulations employed in the production of the materials as well as in analyzing and improving processes of manufacturing the materials. Characterizing the physical properties of particular materials may also assist in developing materials suitable for specific applications.

In the case of some materials, such as polymers, biopolymers, and the like, it may be desirable to characterize the physical properties of the material by measuring the deformation and/or flow of the material under the influence of an applied force (e.g., a tensile force, a shear force, etc.). Conventional rheology tests may generally involve applying a specific stress to a material and monitoring the resultant deformation or strain, and generally include applying forces to the material that result in plastic flow of the material.

SUMMARY

Rheology tests generally result in the plastic deformation of the material during the test. At the conclusion of the test, residue of the material samples must be removed from the testing apparatus before subsequent tests can be performed with new material samples. However, cleaning the residue of the material samples is a difficult and time consuming process, which generally increases testing costs and increases testing cycle time. Accordingly, a need exists for improved systems and methods for testing material samples and cleaning a testing apparatus.

In one embodiment, a rheology system includes a rheometer including a lower plate and an upper plate, a manipulator including an arm, a loading end effector, a cleaning end effector, and a controller communicatively coupled to the rheometer and the manipulator, the controller including a processor and a computer readable and executable instruction set, which when executed, causes the processor to direct the manipulator to couple the loading end effector to the arm, direct the manipulator to engage a specimen with the loading end effector, direct the manipulator to position the specimen on the lower plate of the rheometer, direct the upper plate to engage the specimen between the upper plate and the lower plate, direct the manipulator to couple the cleaning end effector to the arm, and direct the manipulator to engage the lower plate with the cleaning end effector.

In another embodiment, a method for operating a rheometer includes coupling a loading end effector to an arm of a manipulator, engaging a specimen with the loading end effector, positioning the specimen on a lower plate of a rheometer with the loading end effector, engaging the specimen with an upper plate of the rheometer, coupling a cleaning end effector to the arm of the manipulator, and engaging the lower plate with the cleaning end effector.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are generally directed to rheology systems including a rheometer and a manipulator that can be selectively coupled to a loading end effector and a cleaning end effector. The manipulator may automatically load the rheometer with specimens with the loading end effector, and may also load films to a cutting assembly to prepare the specimens for use with the rheometer. Once the rheometer has completed a rheology test on the specimen, the manipulator engages a lower plate and/or an upper plate of the rheometer with the cleaning end effector to remove residue of the specimen from the rheometer. In this way, rheology systems according to the present disclosure may automatically load and clean rheometers, without requiring removal of the lower plate and/or the upper plate from the rheometer. By allowing for automatic loading and cleaning of the rheometer, manual cleaning of the lower plate and/or the upper plate of the rheometer may be reduced or eliminated, thereby reducing testing time and cost. Furthermore, by cleaning the rheometer with the cleaning end effector, the rheometer may be utilized without requiring disposable intermediate components positioned between the lower plate and the specimen being tested, such as liners, which may improve thermal control of the specimen. Moreover, because the lower plate and/or the upper plate of the rheometer do not need to be removed and replaced between testing cycles, it is not necessary to re-heat new plates between testing cycles, reducing testing times and allowing for improved thermal control of the lower plate and/or the upper plate. Furthermore, by physically engaging the lower plate and/or the upper plate with the cleaning end effector, higher viscosity specimens which may not easily be removed chemically by solvents can be removed from the lower plate and/or the upper plate. These and other embodiments of rheology systems are disclosed in greater detail herein with reference to the appended figures.

Figure 1:
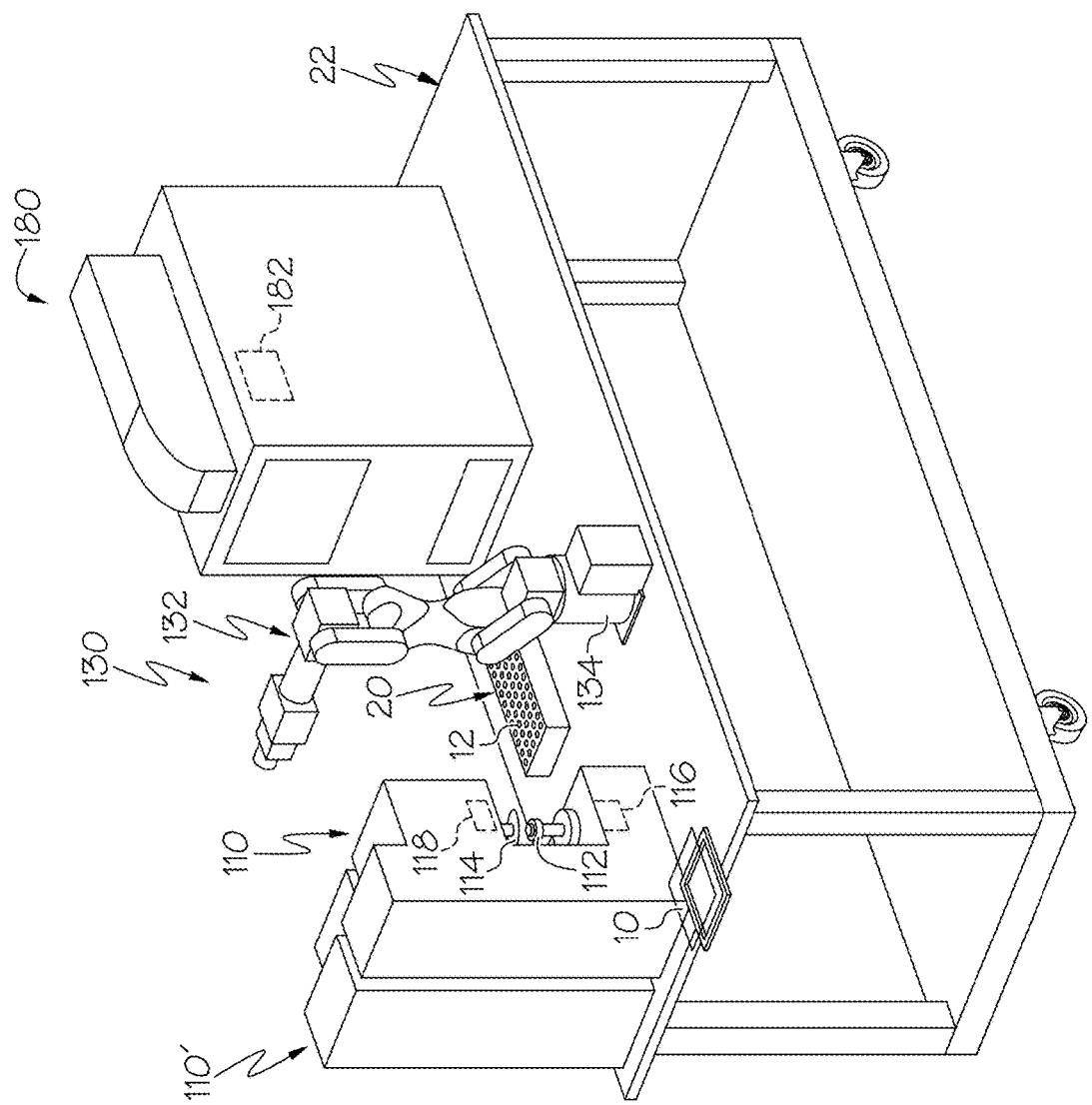
FIG. 1 schematically depicts a perspective view of a rheology system including a rheometer and a manipulator, according to one or more embodiments described and depicted herein.

Referring initially to FIG. 1, a rheology system 100 is schematically depicted. In the embodiment depicted in FIG. 1, the rheology system 100 generally includes a rheometer 110 and a manipulator 130. In some embodiments, the rheology system 100 further includes a cutting assembly 180 that is structurally configured to cut specimens for use with the rheometer 110, as described in greater detail herein. In the embodiment depicted in FIG. 1, the rheology system 100 is positioned on work surface 22 (e.g., a table), however, it should be understood that this is merely an example.

The rheometer 110 generally includes a lower plate 112 and an upper plate 114 spaced apart from the lower plate 112. In the embodiment depicted in FIG. 1, the upper plate 114 is positioned above and is movable toward and away from the lower plate 112. In embodiments, a specimen 12 may be sandwiched between the upper plate 114 and the lower plate 112. While in the embodiment depicted in FIG. 1, the upper plate 114 is described as being movable with respect to the lower plate 112, it should be understood that this is merely an example and in some embodiments, the lower plate 112 may be moved upward to the upper plate 114.

In some embodiments, the rheometer 110 further includes an upper actuator 118 coupled to the upper plate 114. The upper actuator 118 may be directly coupled to the upper plate 114, or may be coupled to the upper plate 114 through one or more intermediate components. The upper actuator 118 is operable to move the upper plate 114, for example in a vertical direction toward and away from the lower plate 112, and/or may be operable to rotate the upper plate 114 about the vertical direction. For example, in some embodiments, the rheometer 110 may test a specimen 12 positioned between the upper plate 114 and the lower plate 112 by rotating the upper plate 114 and monitoring shear within the specimen 12. While in the embodiment depicted in FIG. 1, the rheometer 110 includes a single upper actuator 118, it should be understood that the rheometer 110 may include any suitable number of actuators to move the upper plate 114 in the vertical direction and/or about the vertical direction.

In some embodiments, the rheometer 110 includes a heating element 116 in thermal communication with the lower plate 112 and/or the upper plate 114. In operation, the heating element 116 may apply thermal energy to the lower plate 112 and/or the upper plate 114, respectively, such that thermal energy may be transmitted from the upper plate 114 and/or the lower plate 112 to a specimen 12 positioned between the upper plate 114 and the lower plate 112. For example, in some rheology tests, it is desirable to understand the performance of a specimen 12 at a given temperature, and the heating element 116 may apply thermal energy to the specimen 12 via the lower plate 112 and/or the upper plate 114 to maintain the specimen 12 at a configurable temperature.

While in the embodiment depicted in FIG. 1 the rheometer 110 includes a single heating element 116, it should be understood that the rheometer 110 may include any suitable number of heating elements. The rheometer 110 may include one or more sensors configured to detect one or more attributes of the rheometer 110 and/or specimens tested by the rheometer 110, and may include, for example, one or more temperature sensors and one or more sensors for detecting stress and strain on a specimen 12 being tested by the rheometer 110. In some embodiments, the rheometer 110 may include a commercially available rheometer, such as DHR-2 rheometer available from TA Instruments.

In the embodiment depicted in FIG. 1, the rheology system 100 includes two rheometers 110, 110'. By including two rheometers 110, 110', throughput (e.g., the amount of specimens 12 tested over a predetermined amount of time) of the rheology system 100 may be increased. While in the embodiment depicted in FIG. 1, the rheology system 100 includes two rheometers 110, 110', it should be understood that embodiments described herein may include any suitable number of rheometers and may include a single rheometer. Moreover, in the embodiment depicted in FIG. 1, the rheometers 110, 110' are substantially the same, however, in some embodiments, the rheology system 100 may include different rheometers that are structurally configured to perform different rheology tests.

Still referring to FIG. 1, the manipulator 130 generally includes an arm 132 movably coupled to a base 134. In the embodiment depicted in FIG. 1, the manipulator 130 includes a robot, such as a six-axis robot, however, it should be understood that this is merely an example. In operation, the manipulator 130 generally loads and unloads the cutting assembly 180 and the rheometers 110, 110', as described in greater detail herein.

The cutting assembly 180 is structurally configured to cut films 10 into specimens 12 for testing with the rheometers 110, 110'. The cutting assembly 180 generally includes at least one cutting member 182 that may include a laser, a blade, a cutting wheel, or the like. In operation, one or more films 10 may be provided to the cutting assembly 180, for example via the manipulator 130, and the cutting assembly 180 may cut the one or more films 10 to form specimens suitable for testing with the rheometers 110, 110'. As one example, the cutting assembly 180 may cut a stack of one or more films 10 to a desired size and shape to form the specimens for testing with the rheometers 110, 110'. In some embodiments, the films 10 and the specimens 12 are formed from a polymer, however, it should be understood that the films 10 and the specimens 12 may be formed from any material suitable for rheology testing, for example and without limitation, as glass, rubber, gums, waxes, concrete, gels, muds, biological materials, or the like.

Figure 2:
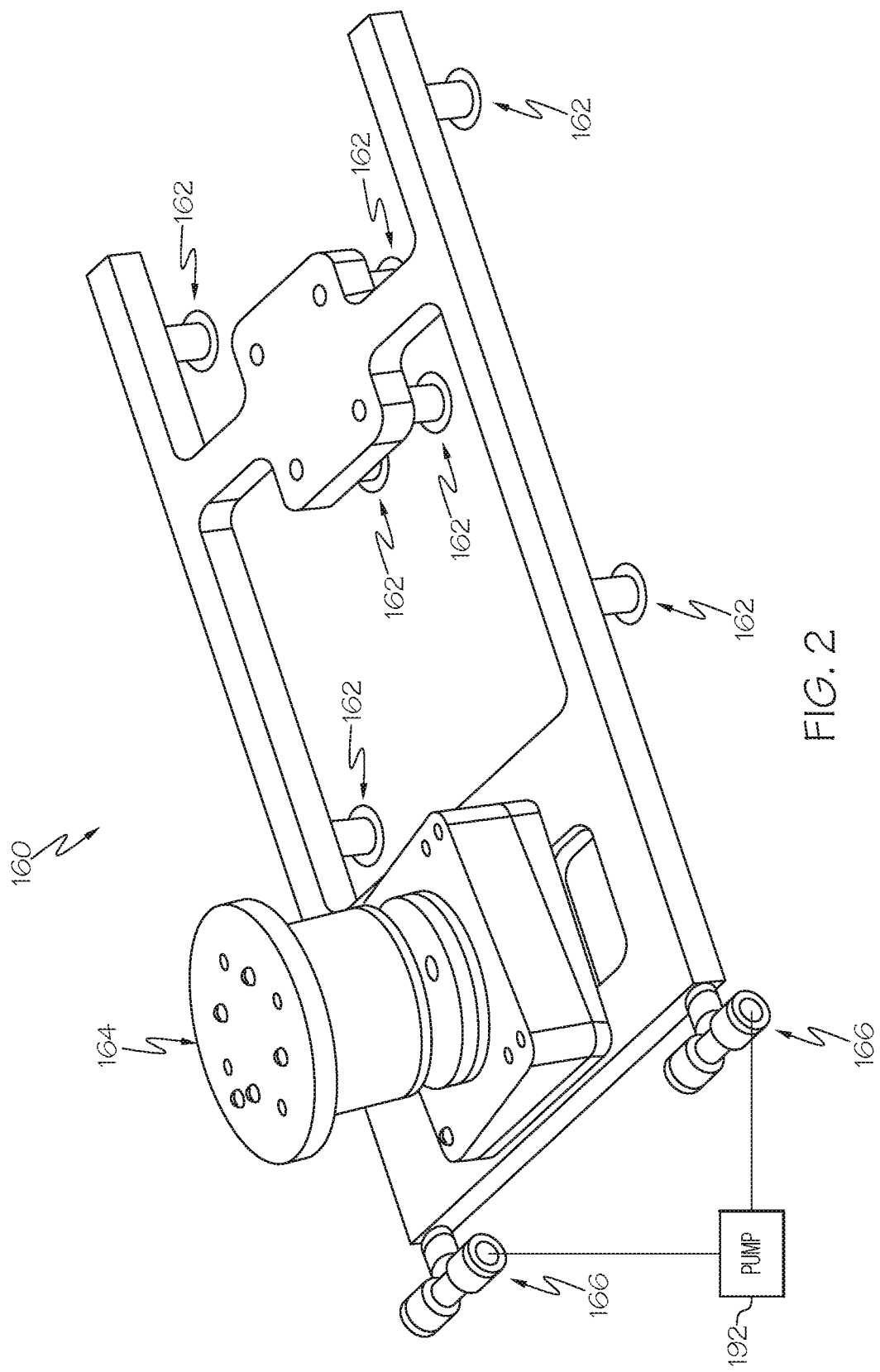
FIG. 2 schematically depicts a perspective view of a loading end effector of the manipulator of FIG. 1, according to one or more embodiments described and depicted herein.
Figure 3:
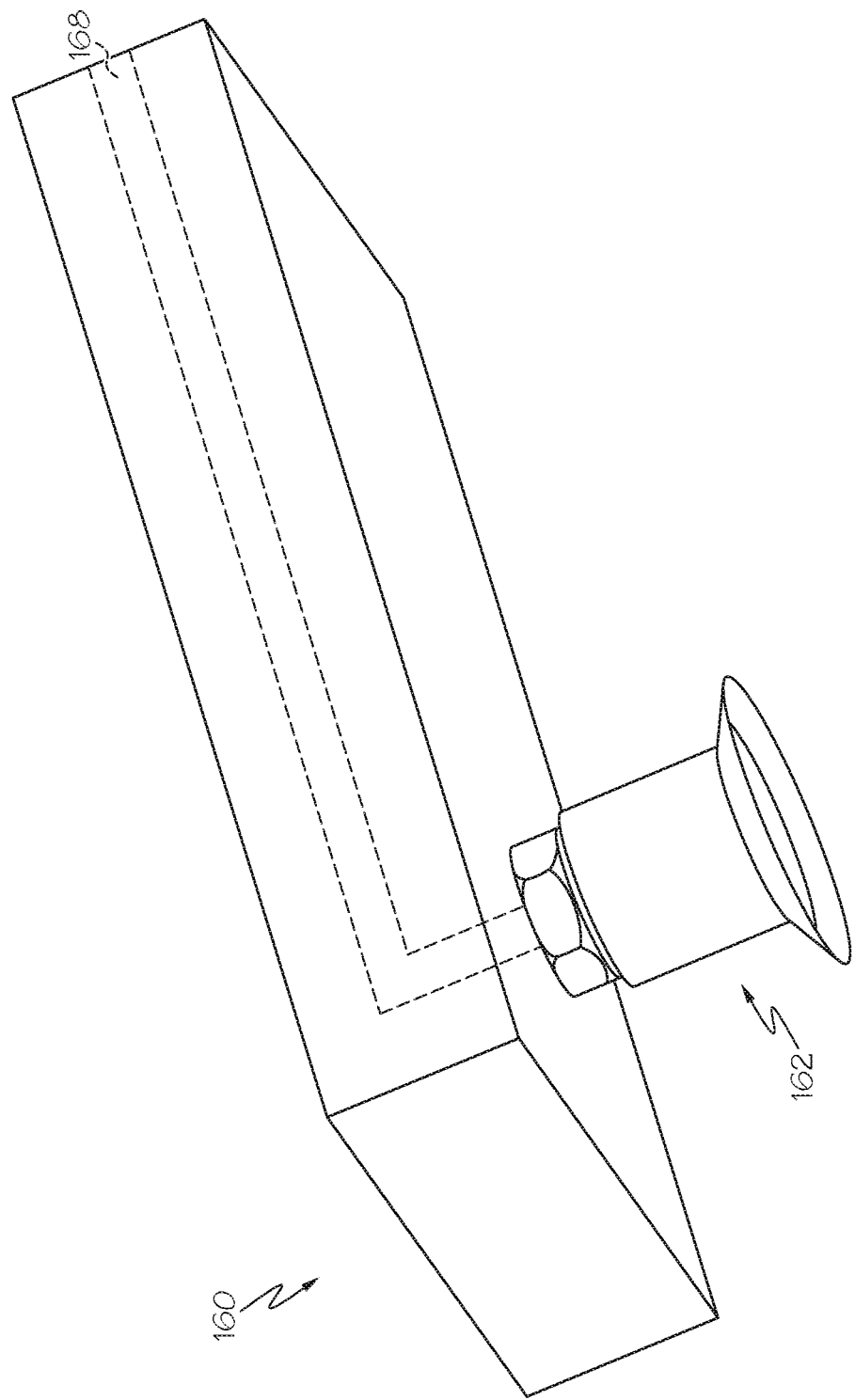
FIG. 3 schematically depicts an enlarged view of a film engagement member of the loading end effector of FIG. 2, according to one or more embodiments described and depicted herein.

Referring to FIGS. 2 and 3, a loading end effector 160 and an enlarged view of a film engagement member 162 of the loading end effector 160 are schematically depicted, respectively. The loading end effector 160 generally includes an arm engagement member 164 that can be selectively coupled to and is selectively removable from the arm 132 (FIG. 1) of the manipulator 130. In embodiments, the loading end effector 160 further includes one or more film engagement members 162 that are structurally configured to engage a specimen 12 (FIG. 1) and/or a film 10 (FIG. 1). In embodiments, the one or more film engagement members 162 may be spaced apart from one another such that the loading end effector 160 can engage different size films.

In some embodiments, the one or more film engagement members 162 may include suction cups or the like that engage the film 10 (FIG. 1) and/or the specimen 12 (FIG. 1). For example, in the embodiment depicted in FIG. 2, the loading end effector 160 includes one or more air inlets 166 that are fluidly coupled to a pump 192 and the one or more film engagement members 162. In some embodiments, the loading end effector 160 includes one or more passageways 168 extending between the one or more film engagement members 162 and the one or more air inlets 166. The one or more passageways 168 may include tubes or the like extending between the one or more air inlets 166 and the one or more film engagement members 163 such that fluid, such as air, may travel between the one or more air inlets 166 and the one or more film engagement members 162. The pump 192, in embodiments, applies a vacuum pressure to the one or more film engagement members 162, such that film and/or specimens may be selectively drawn against the one or more film engagement members 162.

Figure 4:
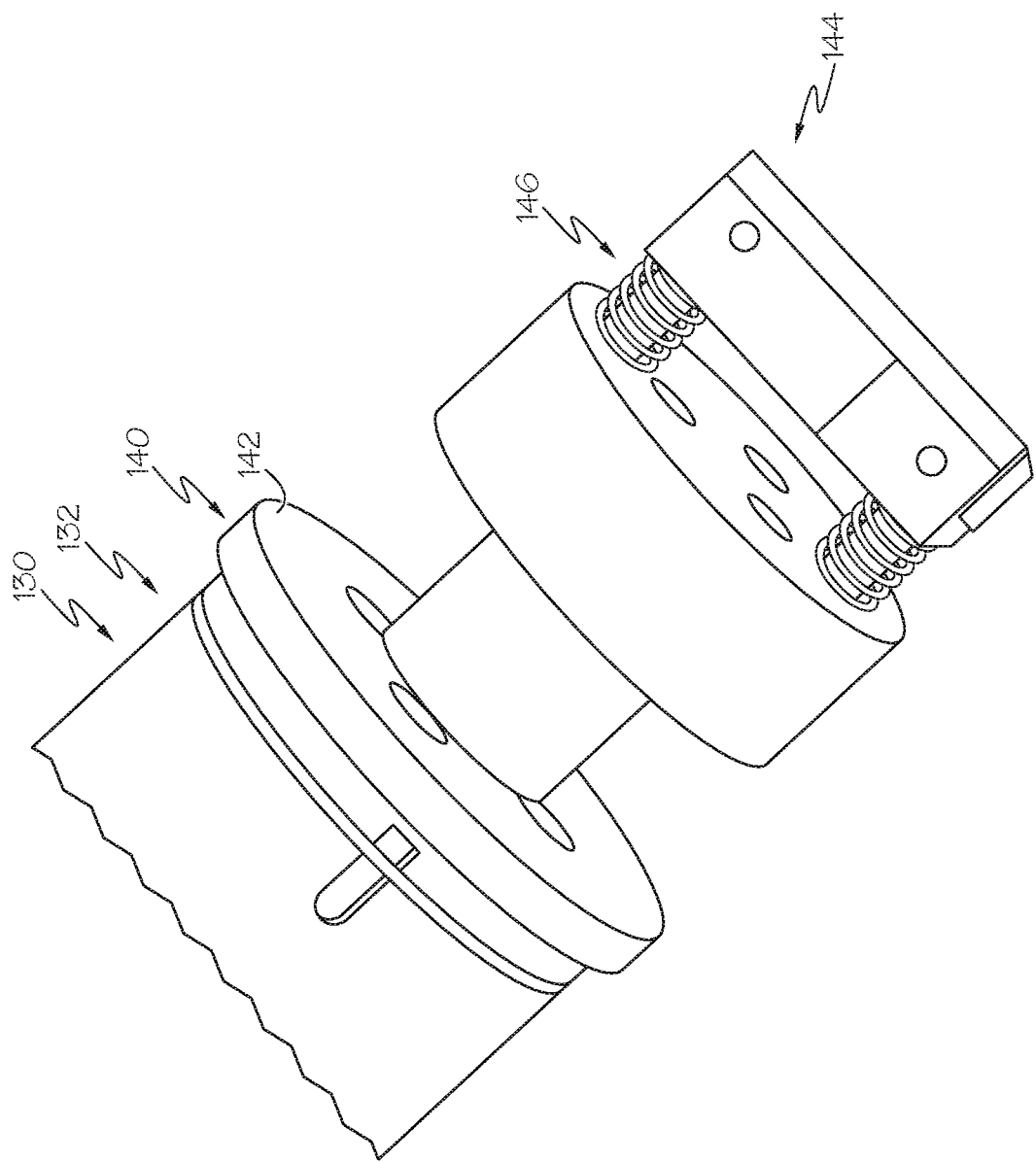
FIG. 4 schematically depicts a perspective view of a cleaning end effector of the manipulator of FIG. 1, according to one or more embodiments described and depicted herein.

Referring to FIG. 4, a perspective view of a cleaning end effector 140 is schematically depicted. In embodiments, the cleaning end effector 140 includes a cleaning edge 144 coupled to an arm engagement member 142. The arm engagement member 142 is selectively coupled to and selectively removable from the arm 132 of the manipulator 130 to selectively couple the cleaning end effector 140 to the manipulator 130. The cleaning edge 144, in operation, engages the lower plate 112 (FIG. 1) and/or the upper plate 114 (FIG. 1) of the rheometer 110 (FIG. 1) to remove residue of a specimen, as described in greater detail herein. In some embodiments, the cleaning edge 144 is formed from a material that is softer than the lower plate 112 (FIG. 1) and/or the upper plate 114 (FIG. 1), such that the cleaning edge 144 does not scratch or damage the lower plate 112 and/or the upper plate 114. In some embodiments, the cleaning edge 144 is formed from brass or the like.

In some embodiments, the cleaning edge 144 is coupled to the arm engagement member 142 through a resilient member 146. Through the resilient member 146, the cleaning edge 144 may be movable with respect to the arm engagement member 142. More particularly, as force is applied to the cleaning edge 144, the resilient member 146 may deform, thereby allowing some freedom of movement of the cleaning edge 144 with respect to the arm engagement member 142. In embodiments, the resilient member 146 may include a spring, such as a compression spring, a torsion spring, an extension spring or the like.

Figure 5:
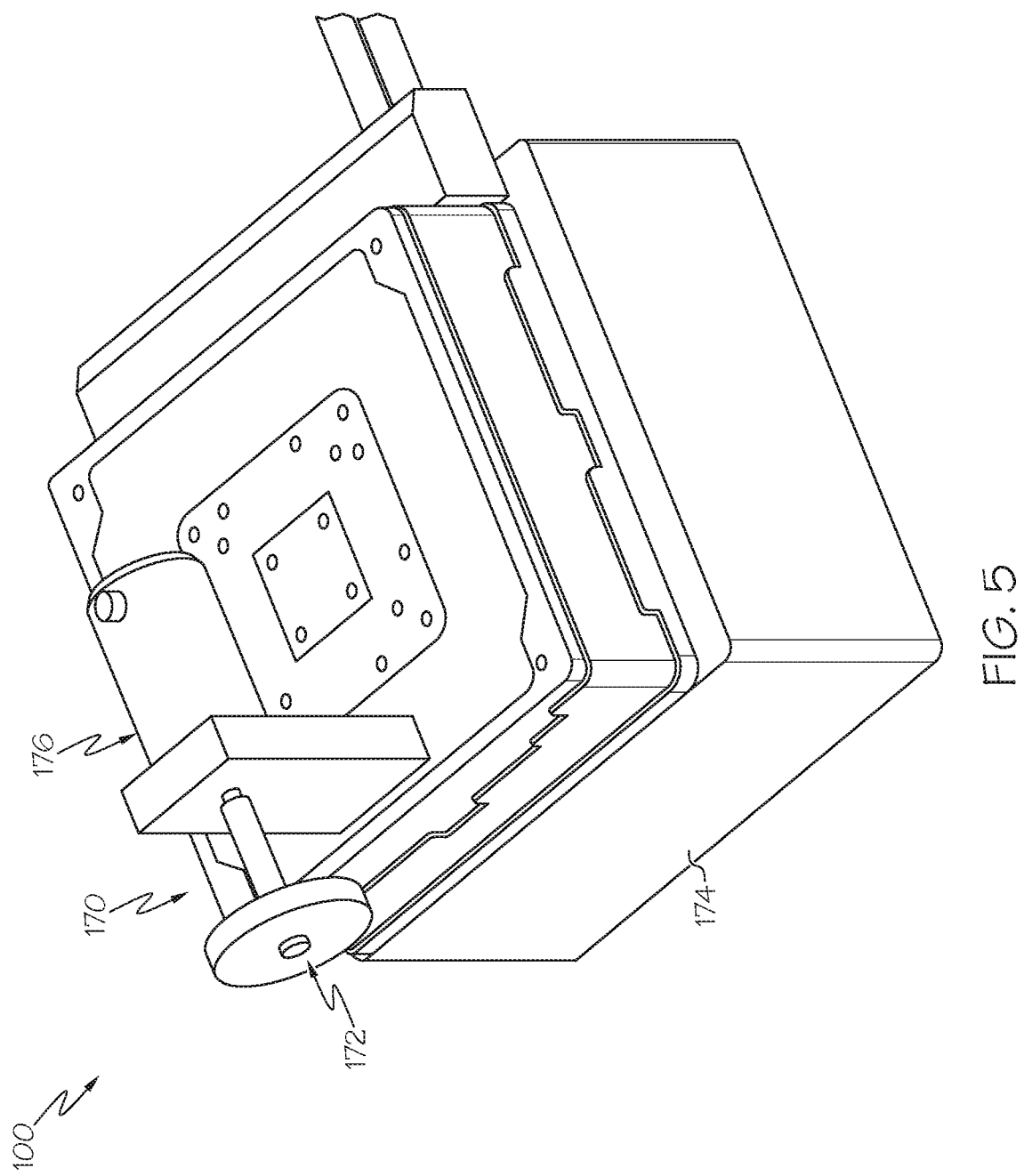
FIG. 5 schematically depicts a secondary cleaning member of the rheology system of FIG. 1, according to one or more embodiments described and depicted herein.

Referring to FIG. 5, a secondary cleaning member 170 of the rheology system 100 is schematically depicted. The secondary cleaning member 170 generally includes a brush 172 rotatably mounted to a base 174. In some embodiments, the brush 172 is coupled to an actuator 176, such as a motor or the like that is structurally configured to rotate the brush 172. The actuator 176 may include, for example and without limitation a direct current (DC) motor, and alternating current (AC) motor, a pneumatic actuator, a hydraulic actuator, or the like. The brush 172, in embodiments, generally includes bristles that may contact the lower plate 112 (FIG. 1) and/or the upper plate 114 (FIG. 1) to remove residue. In some embodiments, the bristles of the brush 172 may be softer than the lower plate 112 (FIG. 1) and/or the upper plate 114 (FIG. 1). In this way, the brush 172 may contact the lower plate 112 and/or the upper plate 114 without scratching the lower plate 112 and/or the upper plate 114. In some embodiments, the secondary cleaning member 170 is structurally configured to be selectively coupled to the manipulator 130 (FIG. 1). In some embodiments, the bristles of the brush 172 may be formed of brass or the like.

Figure 6:
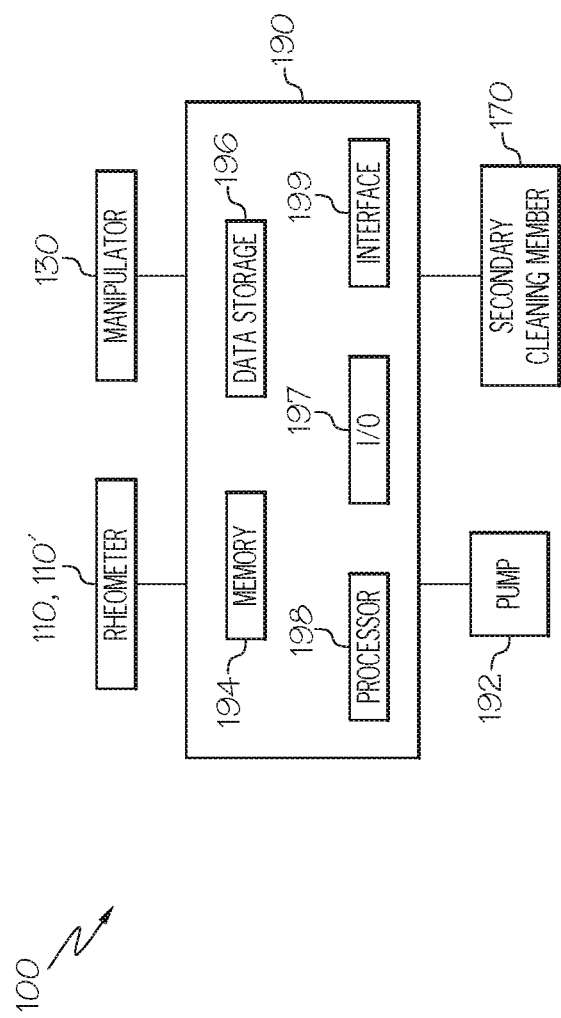
FIG. 6 schematically depicts a control diagram of the rheology system of FIG. 1, according to one or more embodiments described and depicted herein.

Referring to FIG. 6, a control diagram for the rheology system 100 is schematically depicted according to embodiments described herein. The rheology system 100 generally includes a controller 190. As illustrated, the controller 190 includes a processor 198, input/output hardware 197, a network interface hardware 199, a data storage component 196, and a memory component 194. The memory component 194 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 190 and/or external to the controller 190.

The memory component 194 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface is also included in the controller 190, and may be implemented as a bus or other communication interface to facilitate communication among the components of the controller 190.

The processor 198 may include any processing component operable to receive and execute instructions (such as from a data storage component 196 and/or the memory component 194). The input/output hardware 197 may include and/or be configured to interface with microphones, speakers, a display, and/or other hardware.

The network interface hardware 199 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the controller 190 and other computing devices.

It should be understood that while the components in FIG. 6 are illustrated as residing within the controller 190, this is merely an example. In some embodiments, one or more of the components may reside external to the controller 190. It should also be understood that, while the controller 190 is illustrated as a single device, this is also merely an example.

In embodiments, the controller 190 is communicatively coupled to one or more components of the rheology system 100. For example, in the embodiment depicted in FIG. 6, the controller 190 is communicatively coupled to the rheometer 110 (and/or 110'), the manipulator 130, the pump 192, and/or the secondary cleaning member 170.

Referring now to FIGS. 1, 2, 4, 5, 6, and 7, a perspective view of the rheology system 100 is depicted in operation. As noted above, the controller 190 is communicatively coupled to the rheometer 110, the manipulator 130, the pump 192, and/or the secondary cleaning member 170. In embodiments, the controller 190 directs the manipulator 130 to couple the loading end effector 160 to the arm 132 of the manipulator 130. With the loading end effector 160 coupled to the arm 132 of the manipulator 130, the manipulator 130 may engage and move the film 10. For example, in embodiments in which the loading end effector 160 suction cup film engagement members 162, the controller 190 may direct the pump 192 to apply vacuum pressure to the film engagement members 162 to engage the film 10.

The manipulator 130 may position the film 10 at least partially within the cutting assembly 180 with the loading end effector 160, and controller 190 may direct the cutting assembly 180 to cut the film 10 to form one or more specimens 12 for testing with the rheometers 110, 110'. As noted above, the cutting assembly 180 may cut the film 10 to any suitable shape or size for testing with the rheometers 110, 110'. The controller 190 may then direct the manipulator 130 to remove the cut specimen or specimens 12 from the cutting assembly 180.

In the embodiment depicted in FIG. 1, specimens 12 may be temporarily stored in a storage rack 20 before being placed within one of the rheometers 110, 110'. For example, in some embodiments, the cycle time of the cutting assembly 180 to cut the specimens 12 may not necessarily align with the cycle time of the rheometers 110, 110', and accordingly, it may be desirable to temporarily store specimens 12 cut by the cutting assembly 180 before testing the specimens 12 in the rheometers 110, 110'. In this example, the manipulator 130 may remove the cut specimen or specimens 12 from the cutting assembly 180 and deposit the specimen or specimens 12 on the storage rack 20.

The controller 190 directs the manipulator 130 to position a specimen 12 in one of the rheometers 110, 110', for example, via the loading end effector 160. As one example, the manipulator 130 may move a specimen 12 from the storage rack 20 to one of the rheometers 110, 110'. As another example, the manipulator 130 may move a specimen 12 directly from the cutting assembly 180 to one of the rheometers 110, 110'. In embodiments, the controller 190 directs the manipulator 130 to position the specimen 12 between the upper plate 114 and the lower plate 112 of one of the rheometers 110, 110'.

With the specimen 12 positioned between the upper plate 114 and the lower plate 112, the rheometer 110, 110', the controller 190 may direct the rheometer 110, 110' to perform a rheology test on the specimen. For example, the rheometer 110, 110' may lower the upper plate 114 toward the lower plate 112, engaging the specimen 12 between the upper plate 114 and the lower plate 112. In some embodiments, the upper plate 114 may rotate, thereby applying shear force to deform the specimen 12. In some embodiments and as outlined above, the specimen 12 may be heated to a desired temperature by the heating element 116 of the rheometer 110, 110'.

Figure 7:
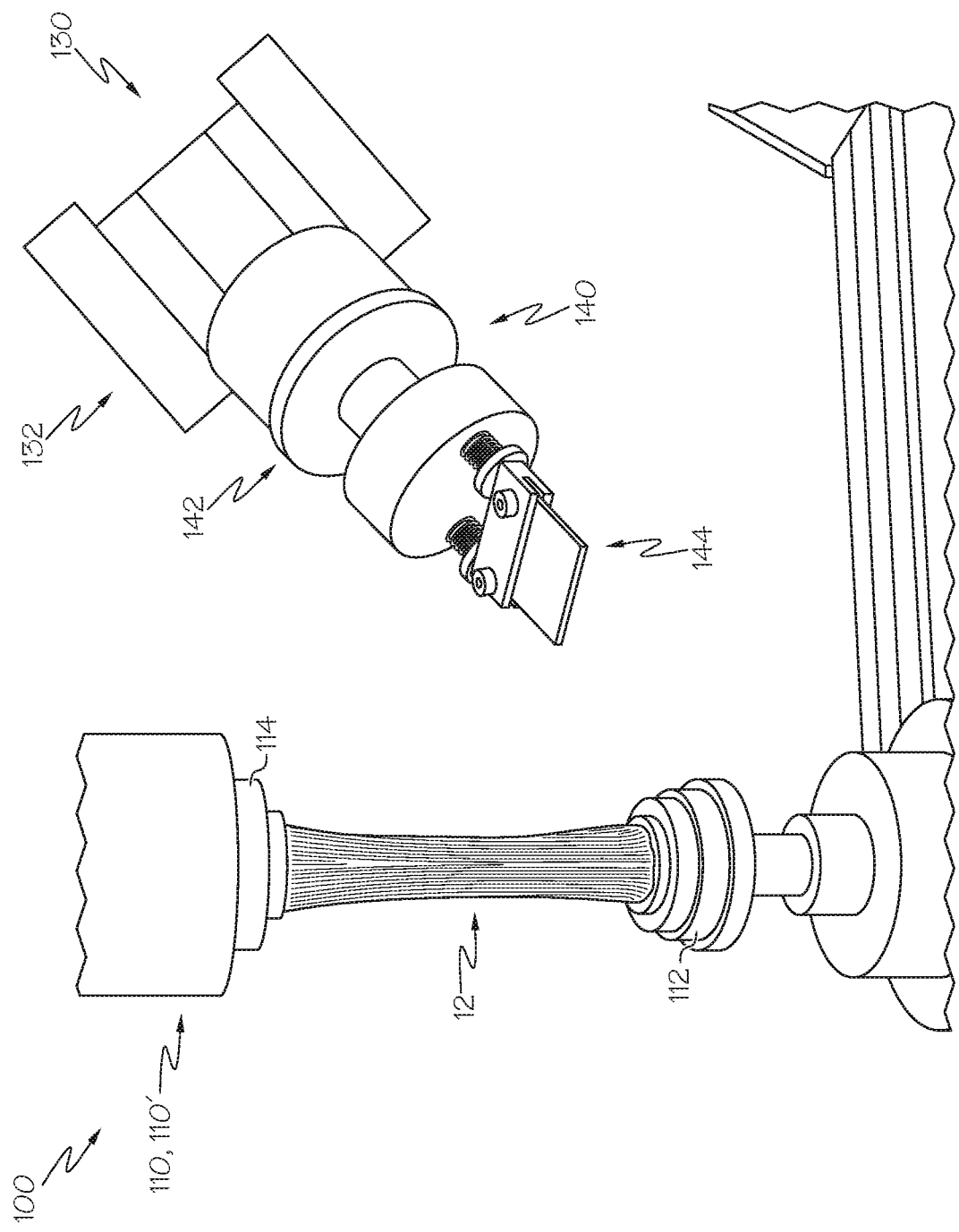
FIG. 7 schematically depicts a perspective view of the cleaning end effector of FIG. 4 approaching the rheometer of FIG. 1, according to one or more embodiments described and depicted herein.

Once the rheology test of the specimen 12 is completed, controller 190 may direct the rheometer 110, 110' to move the upper plate 114 away from the lower plate 112, as depicted in FIG. 7. The controller 190 then directs the manipulator 130 to couple the cleaning end effector 140 to the arm 132 of the manipulator 130.

With the cleaning end effector 140 coupled to the arm 132 of the manipulator 130, the controller 190 directs the manipulator 130 to engage the lower plate 112 and/or the upper plate 114 with the cleaning end effector 140. More particularly, the manipulator 130 engages the lower plate 112 and/or the upper plate 114 with the cleaning edge 144 of the cleaning end effector 140 and "scrapes" residue of the specimen 12 from the lower plate 112 and/or the upper plate 114. In some embodiments, the manipulator 130 may control the force applied to the lower plate 112 and/or the upper plate 114 through positional control of the arm 132. For example, the position of the lower plate 112 and/or the upper plate 114 may be communicated to the manipulator 130 through the controller 190, such that the manipulator 130 may move the cleaning end effector 140 to engage but not damage the lower plate 112 and/or the upper plate 114. In some embodiments, the manipulator 130 and/or the rheometer 110, 110' may include one or more force sensors structurally configured to detect the amount of force applied to the lower plate 112 and/or the upper plate 114. The one or more force sensors may detect the amount of force applied to the lower plate 112 and/or the upper plate 114 via the cleaning end effector 140. In response to the detected force, the controller 190 may direct the manipulator 130 to move the cleaning end effector 140 such that engagement between the cleaning end effector 140 and the lower plate 112 and/or the upper plate 114 is within a configurable threshold that does not damage the lower plate 112 and/or the upper plate 114 or the one or more sensors of the rheometer 110, 110'.

After engaging the lower plate 112 and/or the upper plate 114, residue of the specimen 12 may adhere to the cleaning edge 144 of the cleaning end effector 140. Accordingly, before cleaning the lower plate 112 and/or the upper plate 114 in a subsequent testing cycle, the manipulator 130 may engage the cleaning edge 144 with a surface or cleaning device to remove the residue from the cleaning edge 144. In some embodiments, different cleaning end effectors 140 may be used each testing cycle, allowing for off-line cleaning of the cleaning edge 144 of the cleaning end effector 140.

In embodiments, subsequent to engaging the lower plate 112 and/or the upper plate 114 with the cleaning end effector 140, the controller 190 directs the secondary cleaning member 170 to engage the lower plate 112 and/or the upper plate 114. The controller 190 may further direct the secondary cleaning member 170 to rotate the brush 172, engaging the lower plate 112 and/or the upper plate 114 with the brush 172. In this way, the secondary cleaning member 170 may remove any remaining residue of the specimen 12 from the rheometer 110, 110'.

In some embodiments and as noted above, the secondary cleaning member 170 can be selectively coupled to and removed from the manipulator 130. In these embodiments, the controller 190 directs the manipulator 130 to couple the secondary cleaning member 170 to the arm 132 of the manipulator 130. In some embodiments and as noted above, the secondary cleaning member 170 is independent from the manipulator 130, and may engage the lower plate 112 and/or the upper plate 114 without use of the manipulator 130.

It should now be understood that embodiments described herein are directed to rheology systems including a rheometer and a manipulator that can be selectively coupled to a loading end effector and a cleaning end effector. The manipulator may automatically load the rheometer with specimens with the loading end effector, and may also load films to a cutting assembly to prepare the specimens for use with the rheometer. Once the rheometer has completed a rheology test on the specimen, the manipulator engages a lower plate and/or an upper plate of the rheometer with the cleaning end effector to remove residue of the specimen from the rheometer. In this way, rheology systems according to the present disclosure may automatically load and clean rheometers, without requiring removal of the lower plate and/or the upper plate from the rheometer. By allowing for automatic loading and cleaning of the rheometer, manual cleaning of the lower plate and/or the upper plate of the rheometer may be reduced or eliminated, thereby reducing testing time and cost. Furthermore, by cleaning the rheometer with the cleaning end effector, the rheometer may be utilized without requiring disposable intermediate components positioned between the lower plate and/or the upper plate and the specimen being tested, such as liners, which may improve thermal control of the specimen. Moreover, because the lower plate and/or the upper plate of the rheometer do not need to be removed and replaced between testing cycles, it is not necessary to re-heat new plates between testing cycles, reducing testing times and allowing for improved thermal control of the plate. Furthermore, by physically engaging the plates with the cleaning end effector, higher viscosity specimens which may not easily be removed chemically by solvents can be removed from the plates.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A rheology system comprising:
   a rheometer comprising a lower plate and an upper plate;
   a manipulator comprising an arm;
   a loading end effector, wherein:
     the loading end effector comprises an arm engagement member coupled to one or more film engagement members;
     the arm engagement member comprises a member that can be selectively coupled to and removed from the arm; and
     the one or more film engagement members comprise suction cups fluidly coupled to a pump and configured such that vacuum pressure from the pump causes the specimen to be drawn against the one or more film engagement members;
   a cleaning end effector; and
   a controller communicatively coupled to the rheometer and the manipulator, the controller comprising a processor and a computer readable and executable instruction set, which when executed, causes the processor to:
     direct the manipulator to couple the loading end effector to the arm;
     direct the manipulator to engage a specimen with the loading end effector;
     direct the manipulator to position the specimen on the lower plate of the rheometer;
     direct the upper plate to engage the specimen between the upper plate and the lower plate;
     direct the manipulator to couple the cleaning end effector to the arm; and
     direct the manipulator to engage the lower plate with the cleaning end effector.

2. The system of claim 1, wherein the computer readable and executable instruction set, when executed, further causes the processor to direct the manipulator to engage the upper plate with the cleaning end effector.

3. The system of claim 2, wherein the processor directs the manipulator to engage the upper plate with the cleaning end effector while the upper plate is installed in the rheometer.

4. The system of either of claim 1, further comprising a cutting assembly communicatively coupled to the controller.

5. The system of claim 4, wherein the computer readable and executable instruction set, when executed, further causes the processor to:
   direct the manipulator to position a film at least partially within the cutting assembly with the loading end effector;
   direct the cutting assembly to cut the film to form the specimen; and
   direct the manipulator to remove the specimen from the cutting assembly.

6. The system of claim 1, wherein the cleaning end effector comprises an arm engagement member selectively engaged with the manipulator and a cleaning edge coupled to the arm engagement member.

7. The system of claim 6, wherein the cleaning edge is coupled to the arm engagement member through a resilient member.

8. The system of claim 6, wherein the cleaning edge comprises a material softer than the lower plate.

9. The system of claim 1, further comprising a secondary cleaning member communicatively coupled to the controller, and wherein the computer readable and executable instruction set, when executed, further causes the processor to:

subsequent to directing the manipulator to engage the lower plate with the cleaning end effector, direct the secondary cleaning member to engage the lower plate.

10. The system of claim 9, wherein the computer readable and executable instruction set, when executed, causes the processor to direct the secondary cleaning member to engage the lower plate by directing the secondary cleaning member to rotate a brush that engages the lower plate.

11. The system of claim 9, wherein the computer readable and executable instruction set, when executed, further causes the processor to:
   prior to directing the secondary cleaning member to engage the lower plate, direct the manipulator to couple the secondary cleaning member to the arm of the manipulator.

12. The system of claim 1, wherein the processor directs the manipulator to engage the lower plate with the cleaning end effector while the lower plate is installed in the rheometer.

13. A method for operating a rheometer, the method comprising:
   coupling a loading end effector to an arm of a manipulator, wherein:
      the loading end effector comprises an arm engagement member coupled to one or more film engagement members;
      the arm engagement member comprises a member that can be selectively coupled to and removed from the arm; and
      the one or more film engagement members comprise suction cups fluidly coupled to a pump and configured such that vacuum pressure from the pump causes the specimen to be drawn against the one or more film engagement members;
   engaging a specimen with the loading end effector;
   positioning the specimen on a lower plate of a rheometer with the loading end effector;
   engaging the specimen with an upper plate of the rheometer;
   coupling a cleaning end effector to the arm of the manipulator; and
   engaging the lower plate with the cleaning end effector.

14. The method of claim 13, further comprising cutting a film with a cutting assembly to form the specimen, and removing the specimen from the cutting assembly with the loading end effector.

15. The method of claim 13, wherein the cleaning end effector comprises an arm engagement member selectively engaged with the manipulator and a cleaning edge coupled to the arm engagement member, and wherein engaging the lower plate comprises engaging the lower plate with the cleaning edge.

16. The method of claim 13, further comprising, subsequent to engaging the lower plate with the cleaning end effector, engaging the lower plate with a secondary cleaning member.

17. The method of claim 16, wherein engaging the lower plate with the secondary cleaning member comprises engaging the lower plate with a rotating brush of the secondary cleaning member.

18. The method of claim 16, further comprising prior to engaging the lower plate with the secondary cleaning member, coupling the secondary cleaning member to the manipulator.

19. The method of claim 13, wherein the cleaning end effector engages the lower plate while the lower plate is installed in the rheometer.

* * * * *